May 19, 1936.  O. BARNACK  2,041,633
PHOTOGRAPHIC CAMERA
Filed Feb. 4, 1935
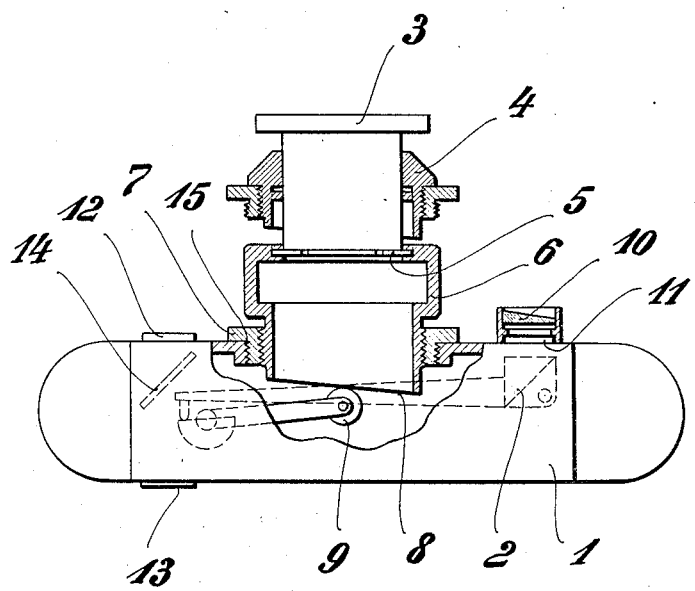
INVENTOR
Oskar Barnack
BY George C. Heinrich
ATTORNEY Patented May 19, 1936

2,041,633

UNITED STATES PATENT OFFICE 2,041,633

PHOTOGRAPHIC CAMERA

Oskar Barnack, Wetzlar, Germany, assignor to Ernst Leitz G. m. b. H., Wetzlar, Germany Application February 4, 1935, Serial No. 4,811
In Germany February 5, 1934

1 Claim. (Cl. 95—44)

This invention relates to improvements in photographic cameras, and it is the principal object of my invention to provide an attachment to enable the taking of pictures of objects which are very close to the camera and the distance of which cannot be measured by the commonly used distance meter.

Another object of my invention is the provision of a camera attachment including an intermediary mounting between the camera and the customary objective to which the objective mounting is secured preferably by means of a bayonet lock.

A further object of my invention is the provision of an intermediary objective mounting or attachment for photographic cameras which is held there by means of a ring and which actuates the lever of the distance meter.

A still further object of my invention is the provision of a camera attachment including an intermediary mounting between camera and objective mounting and the arrangement of a prism in a suitable mounting in front of the distance meter window in order to compensate for the length of the intermediary mounting to allow the measuring of distances of objects very close to the camera.

These and other objects and advantages of my invention will become more fully known as the description thereof proceeds and will then be specifically defined in the appended claim.

In the accompanying drawing forming a material part of this disclosure:

The single figure illustrates a photographic camera constructed according to my invention, partly in section, part of the camera housing being broken away to show the interior arrangement.

As illustrated, a camera 1 in which a distance meter including its mirrors 2 and 14 is coupled or engaged with the curve 8 of the objective mounting by a roller 9 in the manner as for instance illustrated in patent application, Serial No. 629,763 filed August 22, 1932, and copending, has a threaded opening 15 in its wall for the reception of the threaded part of an exchangeable intermediary mounting 6.

A threaded ring 7 is interposed between the threaded wall of the camera opening and the mounting 6 is provided with a bayonet holder or lock 5 for the attachment of the objective mounting 3 for exchangeable objectives of varying focus equipped with the usual adjustment arrangement 4.

The windows for the distance meter are designated 11, 12 and 13, and in front of the window 11 a glass prism or wedge 10 is arranged in a suitable mounting to compensate for the length of the mounting 6.

In use, if it is desired to take pictures of objects which are very close to the camera and which cannot be reached with the usual objective adjustment and measurable distance of for instance 1 meter, the intermediary mounting 6 is inserted into the camera and held therein by means of the ring 7 and is engaged by and acts on the lever of the distance meter in the manner as shown in my above mentioned copending patent application.

By means of the bayonet holder or lock 5 the objective mounting for exchangeable objectives is attached to the mounting 6, and in order to compensate for the length of the mounting 6 and to lower the distance to be measured by the distance meter to about 40 cm. a glass prism or wedge 10 is placed before the window 11 of the distance meter in a suitable mounting.

It will be understood that I have described and shown the preferred form of my invention only as one example of the many possible ways to practically construct the same, and that I may make such changes in its general arrangement and in the construction of the minor details thereof as come within the scope of the appended claims without departure from the spirit of my invention and the principles involved.

Having thus described my invention, what I claim as new and desire to secure by Letters Patent is:

In a camera including its distance meter having a plurality of windows, a lever for said distance meter and objective mounting, an intermediary threaded mounting, a threaded ring securing said intermediary mounting to the camera, a cam face on said intermediary mounting, a roller on the lever of the distance meter adapted to be engaged by said cam face, an exchangeable objective mounting, a bayonet lock adapted to lock said objective mounting to said intermediary member, and a prism in a suitable mounting arranged with its base in front of one of the windows of the distance meter to compensate for the length of said intermediary mounting to allow the measuring of the distance of an object very close to the camera.

OSKAR BARNACK.